United States Patent [19]

Burns

[11] 4,378,617

[45] Apr. 5, 1983

[54] CLASP

[76] Inventor: Gerard Burns, 38 Kawerau Ave., Devonport, Auckland, New Zealand

[21] Appl. No.: 270,381

[22] Filed: Jun. 4, 1981

[51] Int. Cl.³ .................. A44B 17/00; A44B 21/00
[52] U.S. Cl. ............................ 24/336; 24/137 R; 24/255 BS; 248/74 PB
[58] Field of Search ............ 24/137 R, 336, 157, 24/339, 258, 255 R; 248/74 PB

[56] References Cited

U.S. PATENT DOCUMENTS 2,626,439  1/1953  Mack ........................... 24/137 R
3,149,386  9/1964  Trundy ......................... 24/157
3,169,004  2/1965  Rapata ........................ 248/74 PB
3,348,275 10/1967  Lawrence ..................... 24/137 R Primary Examiner—Robert A. Hafer
Attorney, Agent, or Firm—John Cyril Malloy

[57] ABSTRACT

A clasp comprising a pair of hingedly connecting portions with confronting surfaces to clampingly interengage and lock about the marginal edge of a piece of shade cloth for use in horticultural installations and wherein holes are provided through the device for interconnecting with a rope, cord or the like to provide support.

3 Claims, 4 Drawing Figures

CLASP

FIELD OF THIS INVENTION

This invention relates to a clasp or clip particularly suitable for holding netting or the like.

BACKGROUND OF THE INVENTION

This invention is of a clip especially useful in horticulture and which can be used for the attachment of shade cloths and other fabrics to support structures. There are numerous features about the clip including the fact that it is of one-piece bendable molded plastic material and is provided with locking pegs for mating interengagement of the two faces to securely clamp about the marginal edge of a shade cloth and wherein holes are provided to interconnect with support wires which may be run either horizontally or vertically to accommodate attachment to timber frames. A central eyelet hole is provided to facilitate latching to pipe frames. The device is preferably manufactured of high density polypropelene and adapted to provide for substantial long-term use.

OBJECTS OF THE INVENTION

It is an object of this invention to provide an improved clasp.

It is another object of this invention to provide a clasp including a pair of mating surfaces, a hinge portion connecting said mating surfaces together, connection means on said mating surfaces to connect the mating surfaces together, wherein said hinge defines a passageway for a rope, cord, or the like, and said clasp further includes at least one aperture passing through the mating surfaces and spaced apart from said hinge portion to accommodate a rope, cord or the like.

These and other objects which will become apparent from the following description which will now be described on reference to the accompanying drawings.

DESCRIPTION OF THE PREFERRED EMBODIMENT

Figure 1:
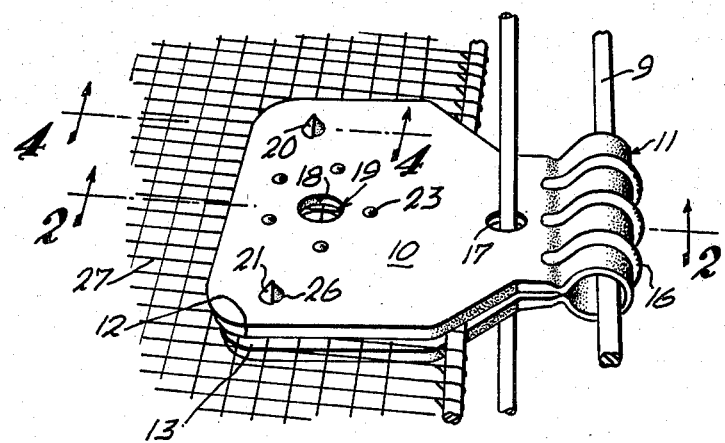
FIG. 1 is a perspective view of the device installed for use.

Referring to the drawings the clip is generally designated by the numeral 10. It has a hinge portion 11 and a pair of mating surfaces 12 and 13. Preferably the mating surfaces are substantially identical to one another so that, when the clip is folded into the closed position, as shown in FIG. 1 and FIG. 2, these mating surfaces are of substantial size and confront one another being adapted to sandwich about a substantial marginal zone of a supported shade sheet.

Figure 2:
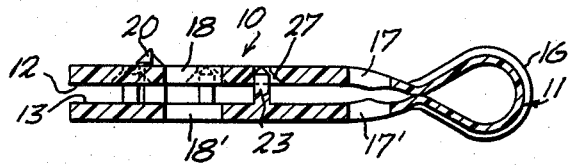
FIG. 2 is a view in cross section taken on the plane indicated by the line 2—2 of FIG. 1 and looking in the direction of the arrows.
Figure 3:
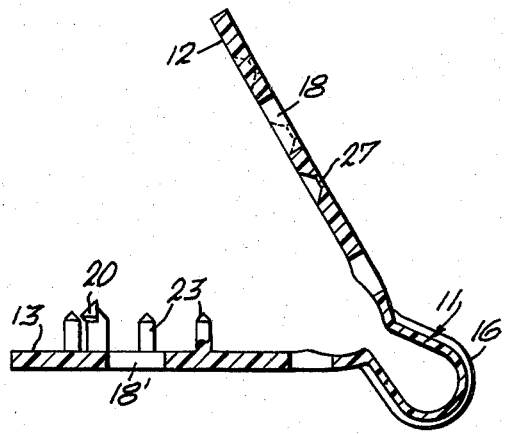
FIG. 3 is a view similar to FIG. 2 showing the clasp in an open position.

Preferably the hinge portion 11 is arcuate in side elevation as seen in FIG. 2 and may be provided with one or more ribs 16 for reinforcement. The hinge zone preferably forms a channel for a rope, cord or the like 9 when the clip is in the closed position, see FIG. 2. In addition, it is preferred that there be a pair of apertures to register with one another when the leaves are in overlaying relation as designated by the numeral 17 and 17'. This provides a passageway therethrough when the clip is closed for a rope 7. It will be noted that this passageway is spaced from the hinge portion 11.

In addition, there are a pair of apertures 18 and 18', which are aligned with one another when the mating surfaces are closed. This provides an additional passageway 18 for a lashing rope, cord or the like.

Figure 4:
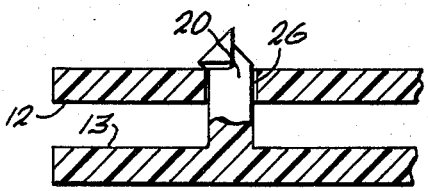
FIG. 4 is a view in cross section taken on the plane indicated by the line 4—4 of FIG. 1 and looking in the direction of the arrows.

Connection means are provided on the inside of the clip, that is, on the mating surfaces. Preferably these take the form of snap fasteners having protruding pins, see FIG. 4, such as that designated by the numeral 20 and each has an enlarged head as seen in FIG. 1 designated by the aforesaid numeral 20 and the numeral 21. These may be of different size depending upon the nature of the material to which the clasp is to be fastened. For example, as shown in the drawings, there is a pair of large pins such as that designated by the numeral 20 in FIG. 4 and there may be a set of five smaller pins, such as the one designated by the numeral 23. There are corresponding large apertures 26 and small apertures 27 corresponding to the protruding pins 20 and 23.

Preferably the five small pins 23 are spaced about the aperture 18 to encircle this aperture as best seen in FIG. 1.

In use, the clasp can be fastened with the material such as netting 27 and a rope 9 can be passed through the main hinge passageway as shown in FIG. 1. Also a rope can be passed through the passageway 17 or passageway 18. The clasp can be attached to a fabric, netting, or the like by placing the two mating surfaces together to enable the connection means to interengage and the material to be suspended by the ropes. The versatility of this clasp enables a rope, cord or the like to be woven in and out of the passageway 17 and 18 from the clasp to clasp along the edge of the material to provide tension along the edge of the material.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. For use to support the marginal edge of pliable sheets, a one-piece normally open clip of bendable plastic material comprising,
a first and second hingedly connected leaf, a hinge zone,
  each leaf having a zone adjacent said hinged connection and a first hole outboard of said hinged connection, each said first hole being at a common distance and relative location to register with one another when the inside surfaces are in confronting relation;
each said leaf having an edge bounding an inside surface to confront one another and an outside surface, and each leaf defining a substantial area to overlay a portion of opposite marginal surfaces of a shade sheet and said edges presenting a smooth surface free and clear of pointed corners as the leaves are viewed in plan, the edge of each leaf having a length parallel to the axis of the hinge zone greater than the length of the edges perpendicular to the hinge zone, said hinged connection comprising a generally circular zone including reinforcing ribs and defining an axial through passageway, a plurality of locating pins on said first leaf extending generally perpendicularly of the inside surface and arranged in spaced relation about said hole, a plurality of recesses in the inside surface of the second leaf for companionate interengagement in registry with the pins for orienting the leaves when in overlaying relation of the margin of a sheet and transmitting forces to the leaves, and lock means comprising a pair of male member each extending from the second leaf towards said first leaf and being located adjacent the outboard edge of the second leaf and one of the edges perpendicular to the axis of the hinge zone and including a barbed outer end for hooked-up engagement in a throughhole provided in the first leaf to hold the pins in their respective recesses and to clamp the clip to the margin of a sheet.

2. The device as set forth in claim 1 wherein the clip is of molded polypropelene.

3. The device as set forth in claim 1 wherein each leaf has a second hole inboard of the respective first holes of said clip to register with one another.

* * * * *